(12) United States Patent
Kato et al.

(10) Patent No.: US 8,863,894 B2
(45) Date of Patent: Oct. 21, 2014

(54) SILENCER AND ROTATING MACHINE EQUIPPED THEREWITH

(71) Applicant: Mitsubishi Heavy Industries, Ltd., Tokyo (JP)

(72) Inventors: Eigo Kato, Tokyo (JP); Toyosei Aota, Tokyo (JP); Hideyuki Morita, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 87 days.

(21) Appl. No.: 13/753,063

(22) Filed: Jan. 29, 2013

(65) Prior Publication Data
US 2013/0213733 A1    Aug. 22, 2013

(30) Foreign Application Priority Data
Jan. 30, 2012 (JP) .................. 2012-016761

(51) Int. Cl.
| | |
|---|---|
| *E04F 17/04* | (2006.01) |
| *B64D 33/02* | (2006.01) |
| *F28F 13/00* | (2006.01) |
| *F02C 7/08* | (2006.01) |
| *F02C 7/24* | (2006.01) |
| *F02G 1/00* | (2006.01) |
| *F24F 13/24* | (2006.01) |
| *F04D 29/66* | (2006.01) |
| *F02C 7/045* | (2006.01) |
| *F01D 25/30* | (2006.01) |

(52) U.S. Cl.
CPC ............... *F02C 7/24* (2013.01); *F05D 2260/96* (2013.01); *F24F 13/24* (2013.01); *F04D 29/664* (2013.01); *F02C 7/045* (2013.01); *F01D 25/30* (2013.01)
USPC ............ 181/224; 181/214; 165/135; 60/39.5; 60/725

(58) Field of Classification Search
CPC ............ F02C 7/045; F02C 7/24; F24F 13/24; F01D 25/30; F01D 25/305; F04D 29/664; F05D 2260/96
USPC ............................... 181/224, 225, 214
See application file for complete search history.

(56) References Cited

U.S. PATENT DOCUMENTS 4,086,063 A  *  4/1978  Garcea .................. 422/177
4,226,279 A  *  10/1980 Eisinger et al. ......... 165/134.1
(Continued)

FOREIGN PATENT DOCUMENTS

| | | |
|---|---|---|
| JP | 61-181225 U | 11/1986 |
| JP | 3-73274 U | 7/1991 |

(Continued)

OTHER PUBLICATIONS

International Search Report of PCT/JP2013/051915, date of mailing date May 7, 2013.

(Continued)

*Primary Examiner* — David Warren
*Assistant Examiner* — Christina Russell
(74) *Attorney, Agent, or Firm* — Westerman, Hattori, Daniels & Adrian, LLP

(57) ABSTRACT

In a silencer, holes are disposed in one row with intervals to each other along one direction, holes forming the one row are disposed in a plurality of rows in a direction perpendicular to the one direction, and positions of the holes in adjacent rows are shifted in the one direction and disposed in a zigzag pattern. A disposition interval of the holes of an outer edge hole row forming one row in at least two sides opposite to each other in the silencing porous plate is set to be larger than a disposition interval of the holes of a row inside the outer edge hole row.

10 Claims, 4 Drawing Sheets

(56) References Cited

U.S. PATENT DOCUMENTS

| | | | |
|---|---|---|---|
| 4,266,602 A * | 5/1981 | White et al. | 165/124 |
| 4,316,435 A * | 2/1982 | Nagamatsu et al. | 122/235.17 |
| 4,753,319 A * | 6/1988 | Vinciguerra | 181/218 |
| 5,517,822 A * | 5/1996 | Haws et al. | 60/618 |
| 6,260,658 B1 * | 7/2001 | Darrell et al. | 181/224 |
| 6,530,452 B1 * | 3/2003 | Pettersson et al. | 181/251 |
| 6,966,172 B2 * | 11/2005 | Nishimura et al. | 60/39.182 |
| 7,028,497 B2 * | 4/2006 | Upton et al. | 62/246 |
| 7,431,127 B2 * | 10/2008 | de Borchgrave et al. | 181/229 |
| 7,913,936 B2 * | 3/2011 | Hoffmann | 239/553 |
| 7,942,234 B2 * | 5/2011 | Utsunomiya | 181/225 |
| 2002/0083836 A1 * | 7/2002 | Doi et al. | 95/278 |
| 2004/0103667 A1 * | 6/2004 | Frutschi | 60/775 |
| 2005/0161280 A1 * | 7/2005 | Furuya | 181/225 |
| 2006/0091243 A1 * | 5/2006 | Hoffmann | 239/589.1 |
| 2006/0096650 A1 * | 5/2006 | Sawchuk et al. | 138/39 |
| 2010/0263964 A1 * | 10/2010 | Kosaka et al. | 181/214 |
| 2013/0168180 A1 * | 7/2013 | Merchant et al. | 181/214 |
| 2014/0076247 A1 * | 3/2014 | Kainu et al. | 122/135.1 |

FOREIGN PATENT DOCUMENTS

| | | |
|---|---|---|
| JP | 09-112244 A | 4/1997 |
| JP | 2000-008882 A | 1/2000 |
| JP | 3515979 B2 | 4/2004 |
| JP | 3631998 B2 | 3/2005 |
| JP | 2007-163685 A | 6/2007 |
| JP | 2011154397 A * | 8/2011 |

OTHER PUBLICATIONS

Written Opinion of PCT/JP2013/051915, date of mailing date May 7, 2013.

* cited by examiner

SILENCER AND ROTATING MACHINE EQUIPPED THEREWITH

TECHNICAL FIELD

The present invention relates to a silencer and a rotating machine equipped therewith.

Priority is claimed on Japanese Patent Application No. 2012-016761, filed Jan. 30, 2012, the content of which is incorporated herein by reference.

BACKGROUND ART

Generally, in a gas turbine, exhaust gas from an exhaust duct becomes a high temperature state of 600° C. or more and is led out at a flow rate of 30 m/second, and at this time, there is a problem in that noise occurs at an outlet of the gas turbine.

Thus, in the related art, a technology is adopted in which a splitter silencer, in which a plurality of silencer panels having silencing effects are disposed along a passage of exhaust gas, is provided in a duct of a gas turbine, and thus, noise is prevented at the time of outflow of the exhaust gas (refer to Patent Document 1 below).

Moreover, a technology regarding silencing is also known in which a silencer, which includes a frame assembled in a lattice shape and a plurality of porous plates of substantially rectangular plate members which are provided on the surface of the frame and in which holes are drilled in a zigzag pattern, is provided, and the silencer is disposed in a direction perpendicular to a passage of exhaust gas. The silencer blocks the passage of the exhaust gas, and silencing effects are obtained due to pressures loss when the exhaust gas passes through the holes. Therefore, noise can be prevented.

CITATION LIST

Patent Document

[Patent Document 1] Japanese Patent No. 3631998

SUMMARY OF THE INVENTION

Problem to be Solved by the Invention

However, in the silencer including the porous plates, vibrating stress is increased in the center in a side direction in the outer edge of a side in which the porous plates are densely disposed, and thus, there is a problem in that strength of the porous plate is decreased.

The present invention is made in consideration of the above-described circumstances, and the present invention provides a silencer capable of decreasing vibrating stress of the silencing porous plate and improving strength of a frame member which supports the silencing porous plate.

Means for Solving the Problem

According to a first aspect of the present invention, there is provided a silencer which includes: a frame member which is provided to be perpendicular to a direction of a fluid passage in a duct in which a fluid flows and is assembled in a four-sided frame shape; and a silencing porous plate in which an outer edge is fixed to the frame member and is configured of an approximately rectangular plate member having a plurality of holes formed thereon. The plurality of holes are disposed in one row with a predetermined interval to each other along one direction, the plurality of holes forming the one row are disposed in a plurality of rows in a direction perpendicular to the one direction, and positions of the holes in adjacent rows are shifted in the one direction and disposed in a zigzag pattern. The predetermined interval of the holes of an outer edge hole row forming one row in at least two opposite sides in the silencing porous plate is set to be larger than a predetermined interval of the holes of a row inside the outer edge hole row.

In the silencer, since the disposition interval of the holes of the outer edge hole row, in which vibrating stress is concentrated in the silencing porous plate, is larger than the disposition interval of the holes of the row inside the outer edge hole row, the vibrating stress in the outer edge hole row can be decreased.

Moreover, as described above, since the vibrating stress in the outer edge hole row is decreased, vibration of the frame member near the outer edge hole row can be decreased. Thereby, since turbulence of a fluid behind the silencer can be suppressed, strength of the frame member which supports the silencing porous plate can be improved.

According to a second aspect of the present invention, in the silencer, the one direction may be the same as a direction of one side of the plate member, and the outer edge hole row is set so that the disposition interval of the holes in an approximately center portion is set to be larger than the disposition interval of the holes in an end portion.

According to this configuration, since the disposition interval of the holes in the approximately center portion of the outer edge hole row is securely larger, vibrating stress in the outer edge hole row can be decreased.

According to a third aspect of the present invention, in the silencer, the one direction is the same as a direction of one side of the plate member, and the disposition interval of the holes of the outer edge hole row is twice the disposition interval of the holes of the row inside the outer edge hole row According to this configuration, since the disposition interval of the holes of the outer edge hole row is securely larger to be twice the disposition interval of the holes of the row inside the outer edge hole row, vibrating stress in the outer edge hole row can be decreased.

According to a fourth aspect of the present invention, in the silencer, the one direction is provided to be inclined from a direction of one side of the plate member, and the disposition interval of the holes of the outer edge hole row may be set to be larger than the disposition interval of the holes of the row inside the outer edge hole row.

According to this configuration, since the disposition interval of the holes of the outer edge hole row is securely larger than the disposition interval of the holes of the row inside the outer edge hole row, vibrating stress in the outer edge hole row can be decreased.

According to a fifth aspect of the present invention, in the silencer, the one direction may be inclined at 15° from the direction of one side of the plate member.

According to the configuration, since the disposition interval of the holes of the outer edge hole row is securely larger, vibrating stress in the outer edge hole row can be decreased.

According to a sixth aspect of the present invention, there is provided a rotating machine which includes the silencer according to any one of the first to fifth aspects.

According to this configuration, since the silencer according to any one of the first to fifth aspects is provided, vibrating stress of the silencing porous plate can be decreased, and strength of the frame member which supports the silencing porous plate can be improved.

Effects of the Invention

According to the above-described silencer, since the disposition interval of the holes of the outer edge hole row in which vibrating stress is concentrated in the silencing porous plate is set so as to be larger than the disposition interval of the holes of the row inside the outer edge hole row, vibrating stress can be decreased in the outer edge hole row of the silencing porous plate, and strength of the frame member which supports the silencing porous plate can be improved.

DESCRIPTION OF EMBODIMENTS (First Embodiments)

Hereinafter, a rotating machine according to a first embodiment of the present invention will be described referring to drawings.

Figure 1:
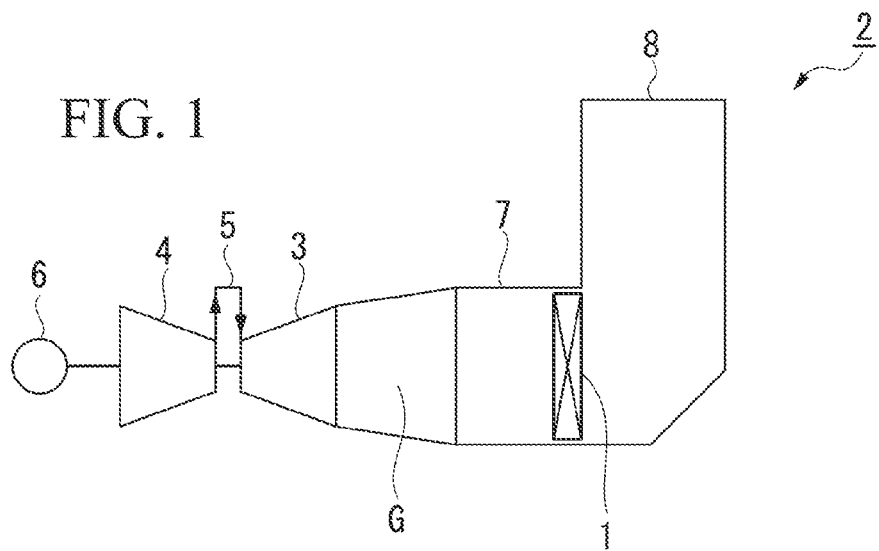
FIG. 1 is a schematic configuration view of a rotating machine according to a first embodiment of the present invention.

FIG. 1 is a schematic configuration view of a plant 2 which includes a gas turbine 3 (rotating machine) according to the first embodiment of the present invention.

As shown in FIG. 1, the plant 2 includes a compressor 4 which compresses air, a combustor 5 which combusts the air compressed by the compressor 4, and a gas turbine 3 which is operated by combustion gas generated by the combustor 5. Moreover, a generator 6 is connected to the compressor 4. Furthermore, exhaust gas G (fluid) generated by the gas turbine 3 passes through a silencer 1 according to the present embodiment provided in a duct 7 and is discharged from a funnel 8 which extends in a vertical direction.

Figure 2:
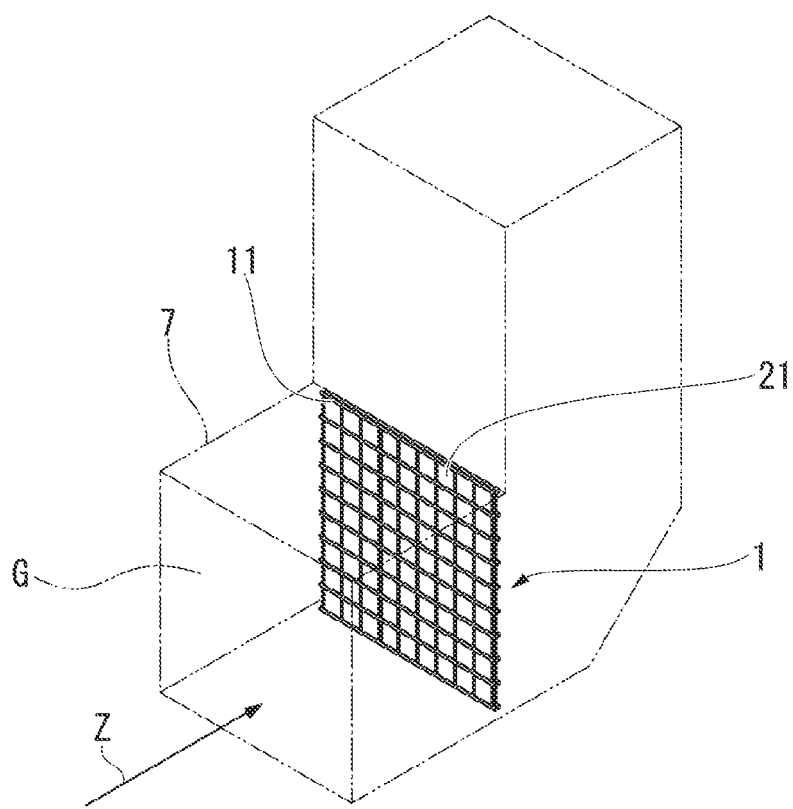
FIG. 2 is a perspective view of a main portion of a silencer according to the first embodiment of the present invention.

As shown in FIG. 2, the silencer 1 includes a frame member 11 which is provided to be perpendicular to a direction of a passage Z of the exhaust gas G in the duct 7 in which the exhaust gas G flows, and a silencing porous plate 21.

Figure 3:
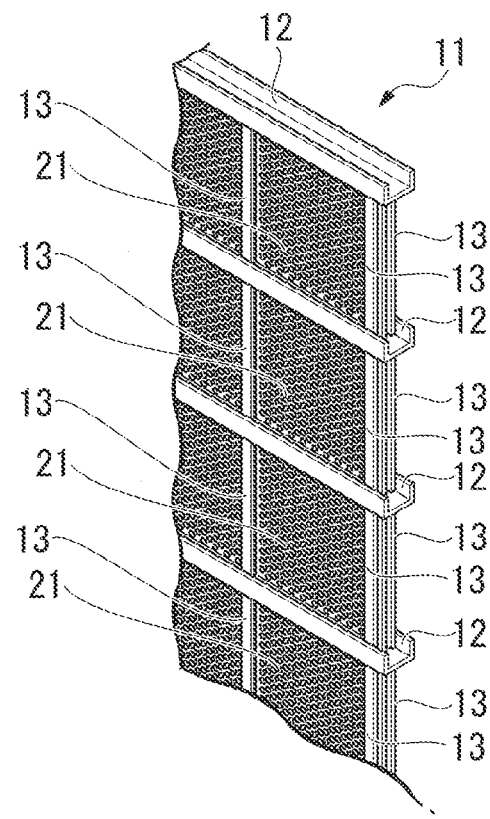
FIG. 3 is an enlarged perspective view of the silencer according to the first embodiment of the present invention.

As shown in FIG. 3, the frame member 11 is assembled in a four-sided frame shape by a plurality of horizontal frames 12 and a plurality of vertical frames 13.

The horizontal frame 12 is a member which is an upward U shape in a cross-section view and extends in a horizontal direction, and a plurality of the horizontal frames are disposed with intervals in the vertical direction. Moreover, as shown in FIG. 2, in the present embodiment, ten horizontal frames are disposed with intervals in the vertical direction.

The vertical frame 13 is a member which extends in the vertical direction so as to be installed between horizontal frames 12 disposed up and down, and a plurality of the vertical frames are disposed with intervals in the horizontal direction. Moreover, as shown in FIG. 3, the vertical frame 13 is a pair of front and rear members, and the silencing porous plate 21 is sandwiched by a pair of vertical frames. Furthermore, as shown in FIG. 2, in the present embodiment, ten vertical frames are disposed with intervals in the horizontal direction.

Figure 4:
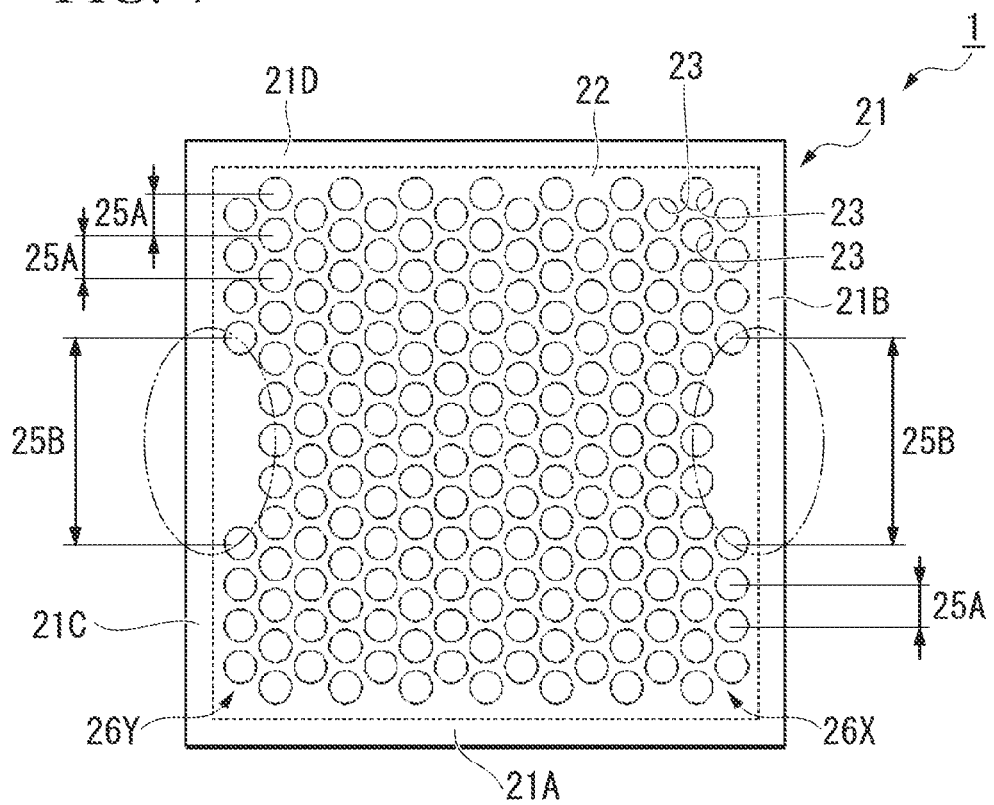
FIG. 4 is a plan view of the silencer according to the first embodiment of the present invention.

As shown in FIG. 4, a plurality of holes 23 are formed on an approximately rectangular plate member 22, and thus, the silencing porous plate 21 is configured. Four sides 21A, 21B, 21C, and 21D of the silencing porous plate 21 are fixed to the frame member 11. In the present embodiment, the silencing porous plate 21 is configured of a stainless steel plate having a thickness of 9 mm, for example, and is fixed to the frame member 11 by welding or the like, for example.

Moreover, in the silencing porous plate 21, the lower side 21A is disposed in the horizontal frame 12 having an upward U shape, the right side 21B and the left side 21C are sandwiched by the vertical frames 13 in front and rear directions, the upper side 21D abuts and is fixed to the lower portion of the horizontal frame 12.

The holes 23 are disposed in one row with intervals to each other along the vertical direction (one direction). Moreover, the vertical direction in which the holes 23 are disposed is the same as the directions of the right side 21B and the left side 21C of the plate member 22. Furthermore, the holes 23 forming the one row are disposed in multiple rows in the horizontal direction (a direction perpendicular to the one direction). Moreover, the positions of the holes 23 in adjacent rows are shifted in the vertical direction and disposed in a zigzag pattern.

Moreover, in disposition intervals of the holes 23 of outer edge hole rows 26X and 26Y forming one row in the right side 21B side and the left side 21C side opposite to each other, a first disposition interval 25A is set at the end portions, and a second disposition interval 25B, which is larger than the first disposition interval 25A, is set at an approximately center portion. Moreover, the disposition intervals of the holes 23 of rows inside the outer edge hole rows 26X and 26Y are set to the first disposition interval 25A. In this way, in the present embodiment, the second interval 25B of the holes 23 of the approximately center portions of the outer edge hole rows 26X and 26Y is set so as to be larger than the first interval 25A of the holes 23 of the rows inside the outer edge hole rows 26X and 26Y.

In the silencer 1 configured as described above, since the second interval 25B of the holes 23 of the approximately center portions of the outer edge hole rows 26X and 26Y, in which the vibrating stress is concentrated in the silencing porous plate 21, is larger than the first disposition interval 25A of the holes 23 of the rows inside the outer edge hole rows 26X and 26Y, the vibrating stress in the outer edge hole rows 26X and 26Y can be decreased.

Moreover, as described above, since the vibrating stress in the outer edge hole rows 26X and 26Y is decreased, vibration of the frame member 11 near the outer edge hole rows 26X and 26Y can be suppressed. Thereby, since turbulence of a fluid behind the silencer 1 can be suppressed, strength of the frame member 11 which supports the silencing porous plate 21 can be improved.

(Second Modification)

Figure 5:
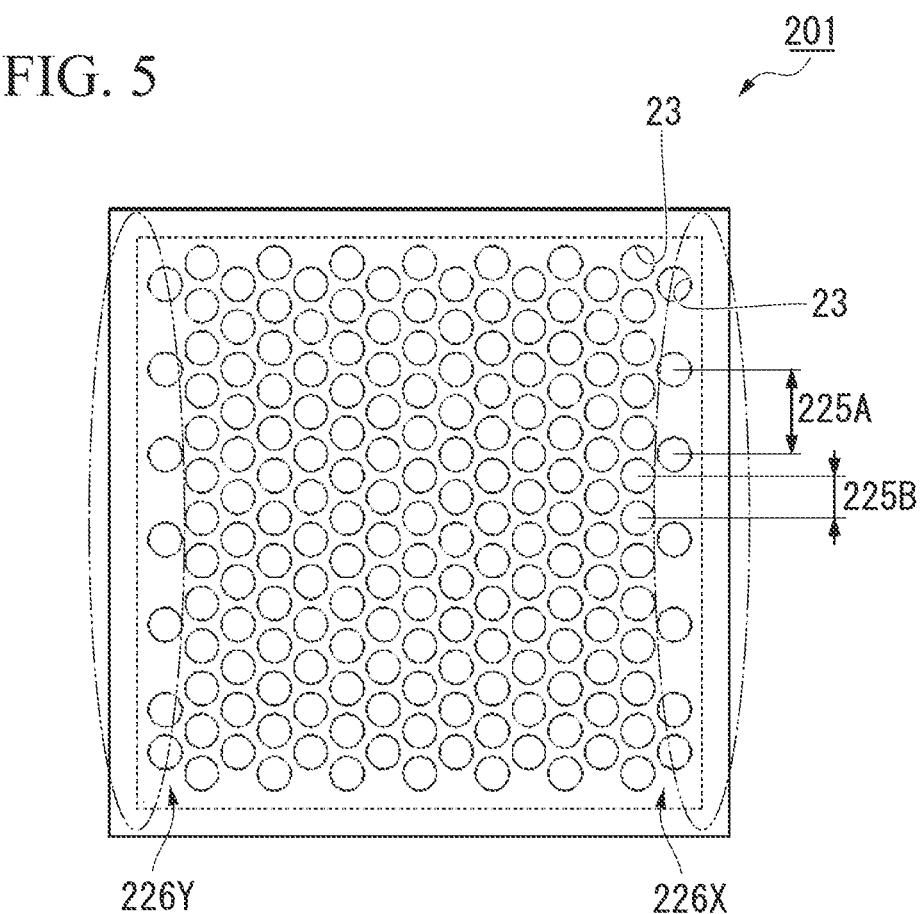
FIG. 5 is a plan view of a silencer according to a second embodiment of the present invention.

Hereinafter, a silencer 201 according to a second embodiment of the present invention will be described referring to FIG. 5.

In this embodiment, the same reference numerals are attached to the members common to the members used in the above-described embodiment, and the descriptions are omitted.

In the silencer 1 according to the first embodiment, the disposition intervals of the holes 23 in the approximately center portions and the end portions of the outer edge hole rows 26X and 26Y are different from each other, and thus, the disposition intervals of the holes 23 in the approximately center portions of the outer edge hole rows 26X and 26Y are set so as to be larger than the disposition intervals of the holes 23 of the rows inside the outer edge hole rows 26X and 26Y. On the other hand, in the silencer 201 according to the present embodiment, the disposition intervals of the holes 23 of outer edge hole rows 226X and 226Y are constant, and the disposition intervals of the holes 23 of the outer edge hole rows 226X and 226Y are set so as to be larger than the disposition intervals of the holes 23 of the rows inside the outer edge hole rows 226X and 226Y.

That is, in the present embodiment, 225A which is a third disposition interval of the holes 23 of the outer edge hole rows 226X and 226Y is set so as to be larger than a fourth disposition interval 225B of the holes 23 of the rows inside the outer edge hole rows 226X and 226Y. In the present embodiment, the third disposition interval 225A is twice the fourth disposition interval 225B.

Moreover, the number is an example and may be appropriately set.

In the silencer 201 configured as described above, since the third disposition interval 225A of the holes 23 of the outer edge hole rows 226X and 226Y is twice the fourth disposition interval 225B of the holes 23 of the rows inside the outer edge hole rows 226X and 226Y, the vibrating stress in the outer edge hole rows 226X and 226Y can be decreased.

(Third Embodiment)

Figure 6:
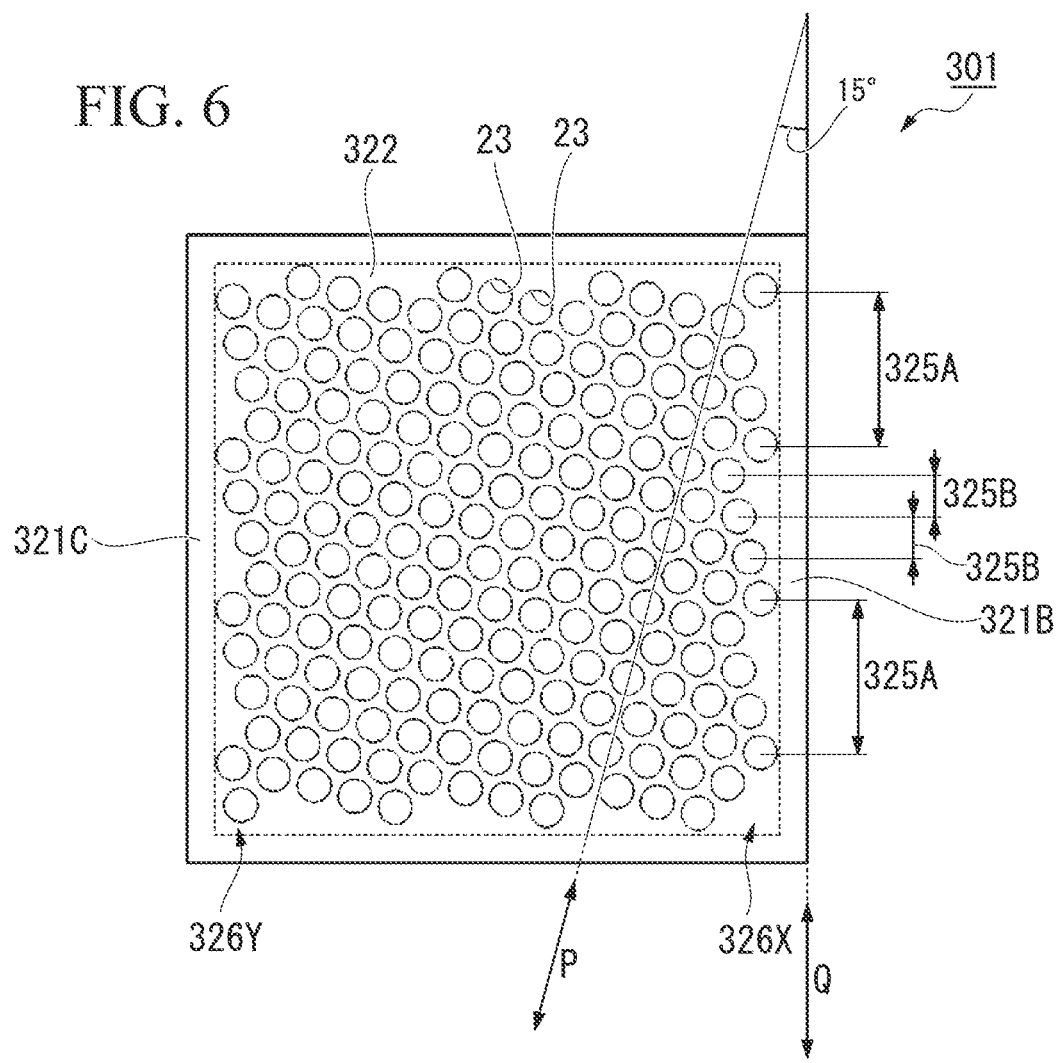
FIG. 6 is a plan view of a silencer according to a third embodiment of the present invention.

Hereinafter, a silencer 301 according to a third embodiment of the present invention will be described referring to FIG. 6.

In this embodiment, the same reference numerals are attached to the members common to the members used in the above-described embodiments, and the descriptions are omitted.

In the silencer 1 according to the first embodiment, the vertical direction in which the holes 23 are disposed is the same as the direction of the right side 21B (or left side 21C) of the plate member 22. On the other hand, in the silencer 301 according to the present embodiment, the direction in which the holes 23 are disposed is provided so as to be inclined from the directions of a right side 321B and a left side 321C of a plate member 322.

That is, in the present embodiment, the direction (P direction shown in FIG. 6) in which the holes 23 are disposed with a predetermined interval is provided so as to be inclined at 15° from the direction (Q direction shown in FIG. 6) of the right side 321B (or the left side 321C) of the plate member 322. Thereby, a fifth disposition interval 325A of the holes 23 of outer edge hole rows 326X and 326Y is set so as to be larger than a sixth disposition interval 325B of the holes 23 of the rows inside the outer edge hole rows 226X and 326Y Moreover, the number is an example and may be appropriately set.

In the silencer 301 configured as described above, since the fifth disposition interval 325A of the holes 23 of the outer edge hole rows 326X and 326Y is larger than the sixth disposition interval 325B of the holes 23 of the rows inside the outer edge hole rows 326X and 326Y, the vibrating stress in the outer edge hole rows 326X and 326Y can be decreased.

Moreover, the shapes, the combinations, or the like of each component shown in the above-described embodiments are examples and may be variously modified based on design requirements or the like within a scope which does not depart from the gist of the present invention.

INDUSTRIAL APPLICABILITY

According to the above-described silencer, the disposition intervals of the holes of the outer edge hole row in which vibrating stress is concentrated in the silencing porous plate are set so as to be larger than the disposition intervals of the holes of the rows inside the outer edge hole row. Thereby, the vibrating stress can be decreased in the outer edge hole row of the silencing porous plate, and the strength of the frame member which supports the silencing porous plate can be improved.

REFERENCE SIGNS LIST 1, 201, 301: silencer
3: gas turbine
7: duct
11: frame member
21: silencing porous plate
22: plate member
23: hole
26X: outer edge hole row
26Y: outer edge hole row

The invention claimed is:

1. A silencer comprising:
    a frame member which is provided to be perpendicular to a direction of a fluid passage in a duct in which a fluid flows and is assembled in a four-sided frame shape; and
    a silencing porous plate in which an outer edge is fixed to the frame member and is configured of an approximately rectangular plate member having a plurality of holes formed thereon,
    wherein the plurality of holes are disposed in one row with intervals to each other along one direction, the plurality of holes forming the one row are disposed in a plurality of rows in a direction perpendicular to the one direction, positions of the holes in adjacent rows are shifted in the one direction and disposed in a zigzag pattern, and
    a disposition interval of the holes of an outer edge hole row forming one row in at least two sides opposite to each other in the silencing porous plate is set to be larger than a disposition interval of the holes of a row inside the outer edge hole row.

2. The silencer according to claim 1, wherein
    the one direction is the same as a direction of one side of the plate member, and
    the outer edge hole row is set so that the disposition interval of the holes in an approximately center portion is set to be larger than the disposition interval of the holes in an end portion.

3. A rotating machine comprising the silencer according to claim 2.

4. The silencer according to claim 1, wherein
    the one direction is the same as a direction of one side of the plate member, and
    the disposition interval of the holes of the outer edge hole row is twice the disposition interval of the holes of the row inside the outer edge hole row.

5. A rotating machine comprising the silencer according to claim 4.

6. The silencer according to claim 1, wherein
    the one direction is provided to be inclined from a direction of one side of the plate member, and the disposition interval of the holes of the outer edge hole row is set to be larger than the disposition interval of the holes of the row inside the outer edge hole row.

7. A rotating machine comprising the silencer according to claim 6.

8. The silencer according to claim 6,
    wherein the one direction is inclined at 15° from the direction of one side of the plate member.

9. A rotating machine comprising the silencer according to claim 8.

10. A rotating machine comprising the silencer according to claim 1.

* * * * *